Figure 1:
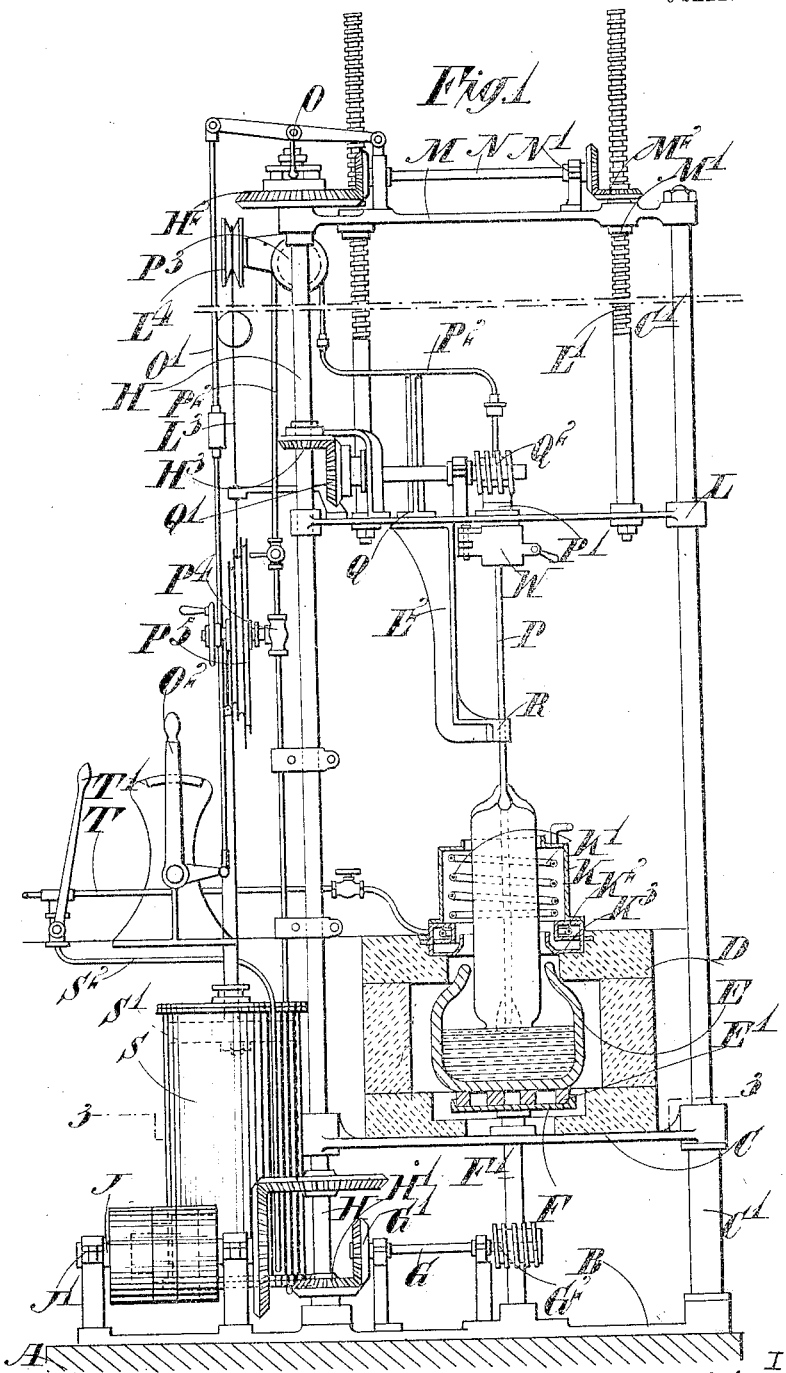

No. 821,478. PATENTED MAY 22, 1906.
J. FORSTER.
APPARATUS FOR THE MANUFACTURE OF GLASS CYLINDERS.
APPLICATION FILED OCT. 31, 1904.

6 SHEETS—SHEET 1.

Witnesses:
Thomas Durant
Melville D. Church

Inventor
John Forster
by Church & Church
his attys

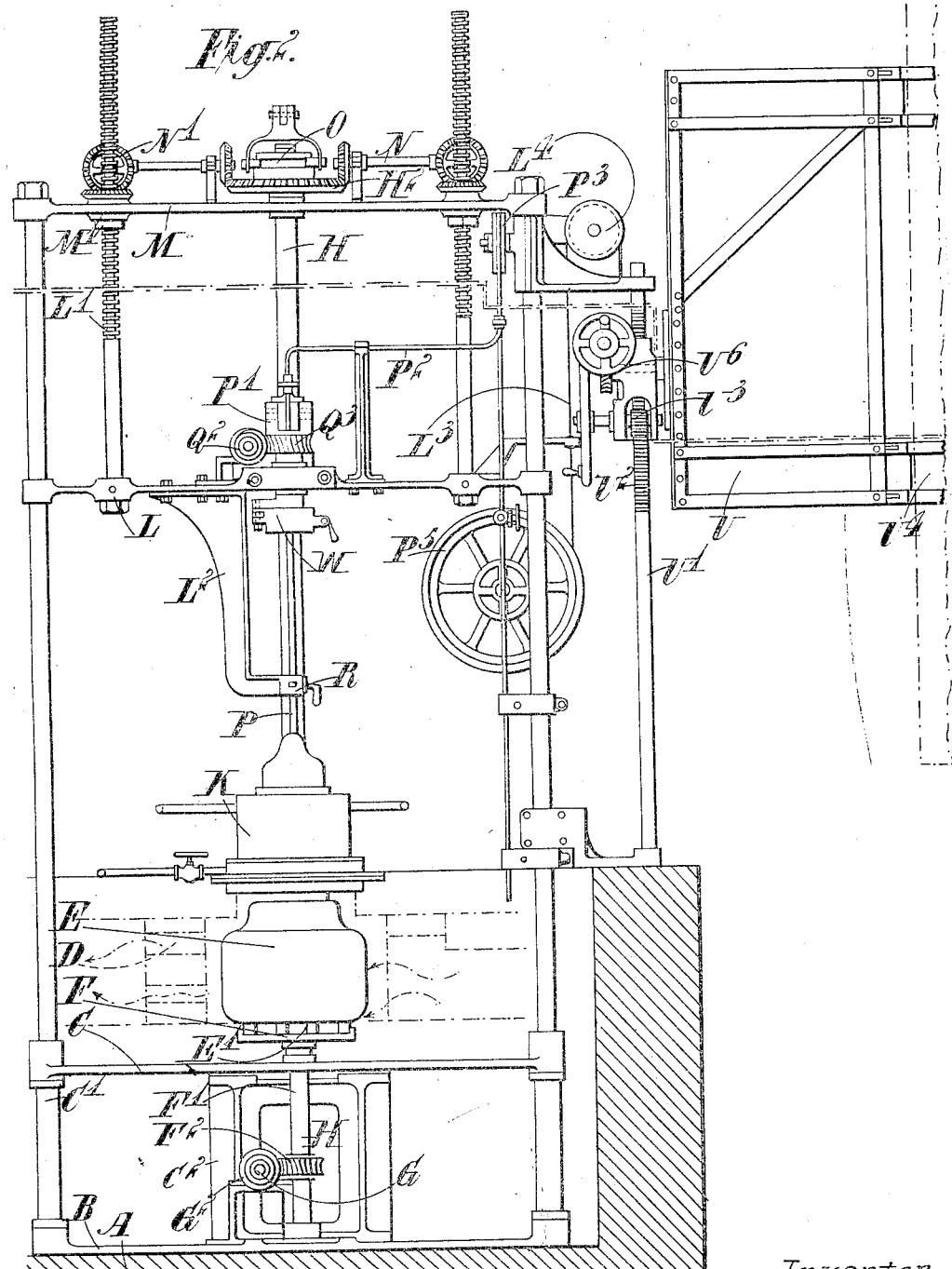

No. 821,478. PATENTED MAY 22, 1906.
J. FORSTL..
APPARATUS FOR THE MANUFACTURE OF GLASS CYLINDERS.
APPLICATION FILED OCT. 31, 1904.

6 SHEETS—SHEET 3.

Witnesses
Thomas Durant
Melville D. Church

Inventor:
John Forster
by Church & Church
his Attys

No. 821,478. PATENTED MAY 22, 1906.
J. FORSTER.
APPARATUS FOR THE MANUFACTURE OF GLASS CYLINDERS.
APPLICATION FILED OCT. 31, 1904.
6 SHEETS—SHEET 4.
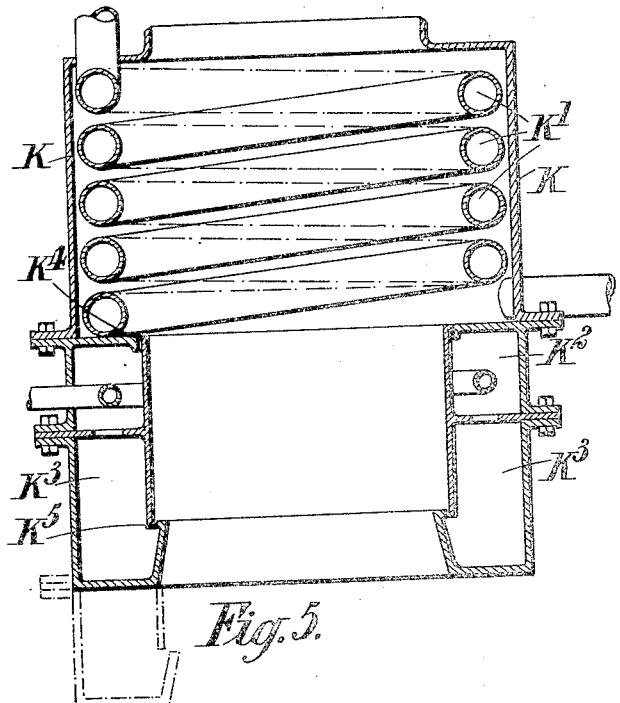
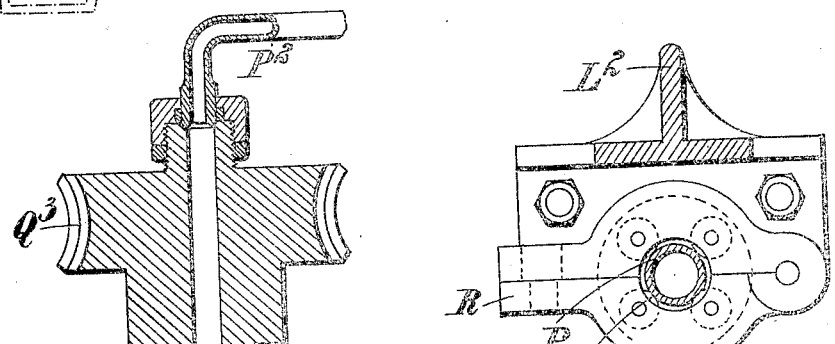
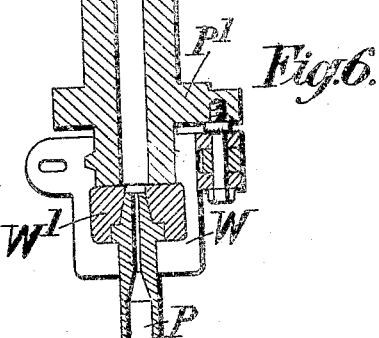
Witnesses
Thos. Durant
U. D. Church
Inventor
John Forster
by Church & Church
his Attys

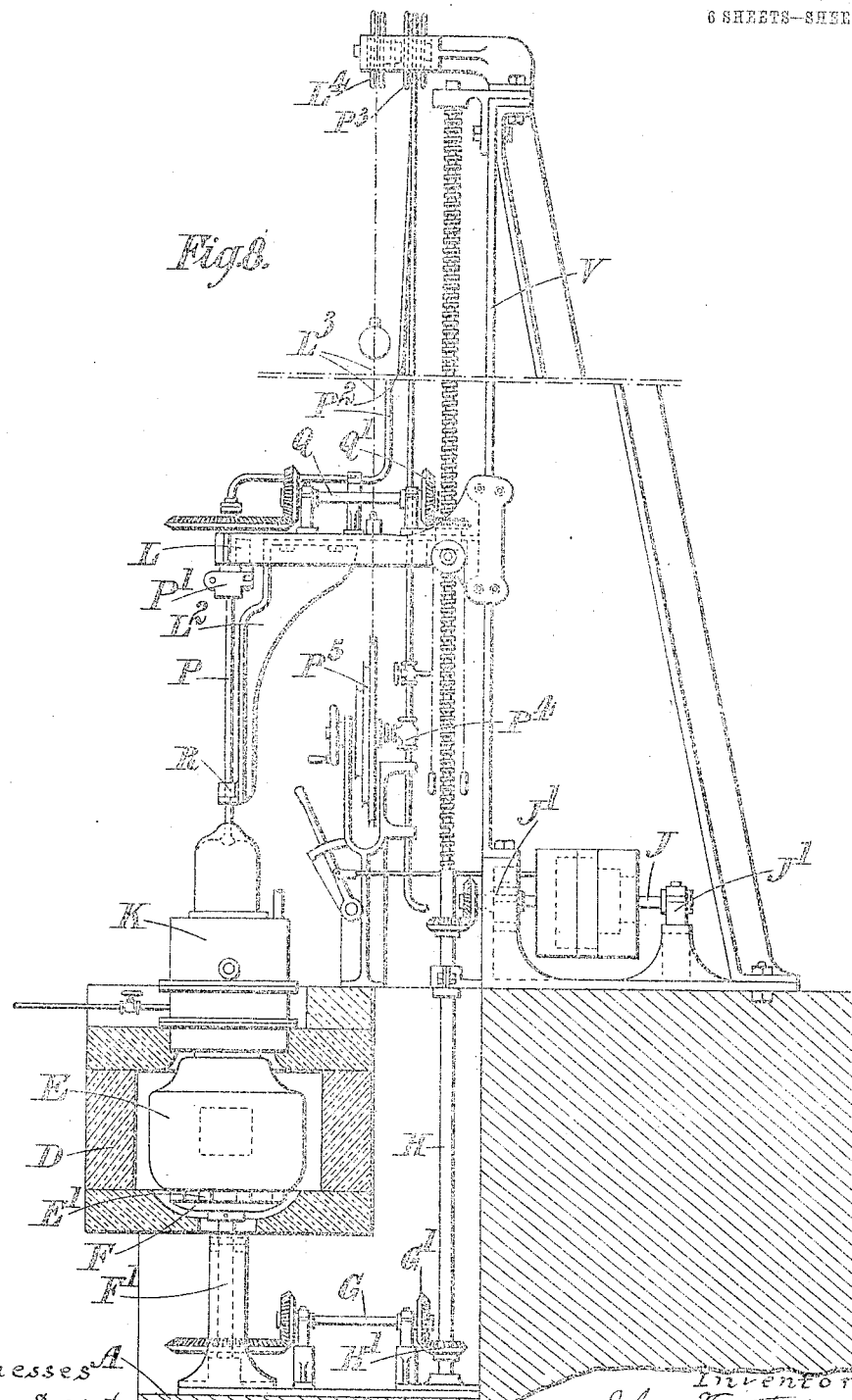

No. 821,478. PATENTED MAY 22, 1906.
J. FORSTER.
APPARATUS FOR THE MANUFACTURE OF GLASS CYLINDERS.
APPLICATION FILED OCT. 31, 1904.

6 SHEETS—SHEET 6.

Witnesses
Thomas Durant
Melville D. Church

Inventor:
John Forster
by
J. Church & Church
his Attys

UNITED STATES PATENT OFFICE.

JOHN FORSTER, OF ST. HELENS, ENGLAND.

APPARATUS FOR THE MANUFACTURE OF GLASS CYLINDERS.

No. 821,478.  Specification of Letters Patent.  Patented May 22, 1906

Application filed October 31, 1904. Serial No. 230,775.

*To all whom it may concern:*

Be it known that I, JOHN FORSTER, a subject of the King of England, residing at St. Helens, county of Lancaster, England, have invented a certain new and useful Apparatus for the Manufacture of Glass Cylinders, of which the following is a specification.

This invention relates to the manufacture of glass and apparatus therefor, and has particular reference to the making of drawn glass cylinders from which window-glass is afterward made, although it is not restricted thereto.

The primary object of the invention is the construction of a machine whereby cylinders of uniform thickness and shape can be manufactured without the employment of skilled manual labor.

According to this invention I arrange the well or vessel which contains the molten glass so that it can be uniformly rotated within a heating-chamber, the vessel being so supported that the gas-flame or other heating agent can pass around and underneath it. The rotation of the vessel is accomplished by suitable gearing, and the blowpipe, which is lowered into the molten glass in this vessel and from which the cylinder depends during the drawing operation, can also be rotated, preferably at the same speed as the vessel. This rotation of the blowpipe is accomplished by mounting the pipe in a rotatable head carried on a frame which is capable of being moved mechanically up and down above the vessel.

Another feature of the invention is the provision of a graduated cooling-chamber through which the cylinder passes and which can swing out of position while the metal is being put into the vessel. This cooling-chamber is mounted at the top of the inclosing heating-chamber, so that it surrounds the opening above the vessel. The cooling-chamber is preferably arranged so that air under pressure can be admitted through an annular space near the bottom to cause what may be termed a "cylinder" of air to pass up inside the chamber and around the cylinder being drawn, care being taken that this air does not actually impinge on the surface of the cylinder. Higher up—say about midway in the chamber—is another annular opening to admit more cooling-air, and the upper part of the chamber is provided with a coil of piping through which a cooling fluid is circulated to further cool the air between it and the cylinder being drawn. Thus in the construction described the cylinder of glass would be subjected to three grades of cooling before it emerged from the chamber into the atmosphere, although it will of course be understood that the chamber may be arranged to give a greater or a less number of graduations of air and that the coil of pipes may be dispensed with.

In order to guide the blowpipe as it rotates and keep it central, a clip is provided mounted upon the vertically-movable frame, and this clip may conveniently comprise two hinged members provided with friction-rollers which when the members are closed surround the blowpipe and keep it in vertical alinement, while allowing it to rotate freely.

Air for blowing the cylinder is supplied to the pipe through fixed and flexible tubes, preferably from a mechanical compressor containing under pressure the amount of air required for blowing the cylinder in course of manufacture. This compressor may be operatively connected to some movable part of the machine, so that the air is supplied only as the drawing operation proceeds. Whether the supply is from such a mechanical compressor or, as sometimes may be the case, from a reservoir of air stored under pressure it is convenient to provide a valve to control the passage of air to the blowpipe, and this valve may be regulated mechanically as the drawing operation continues. The object of these arrangements for the supply and control of the air is to insure that the cylinder as it is drawn shall be of uniform diameter.

In order that the cylinder of glass when drawn may be quickly and safely brought into a horizontal position for removal, mechanism is provided conveniently comprising a frame with bands or clips adapted to embrace the cylinder. This frame can be raised or lowered by gearing—say by a rack and pinion forming part of the frame of the machine—and can be turned so that the drawn cylinder can be embraced by the bands. The frame may then be turned back and moved by gearing, so as to bring the cylinder into a horizontal position.

Figure 4:
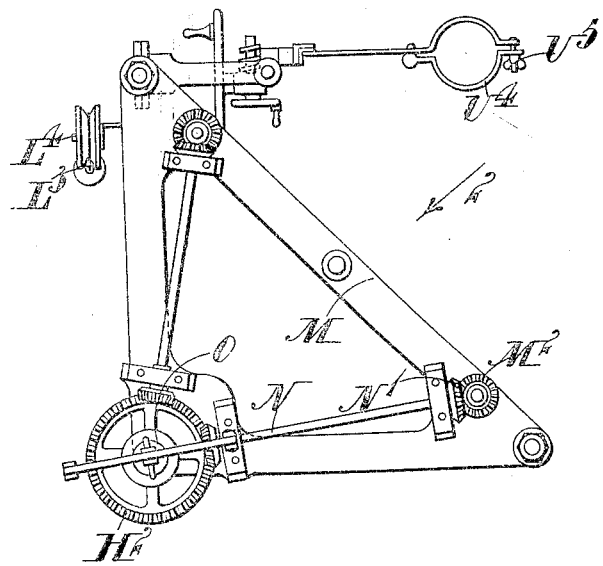
Figure 3:
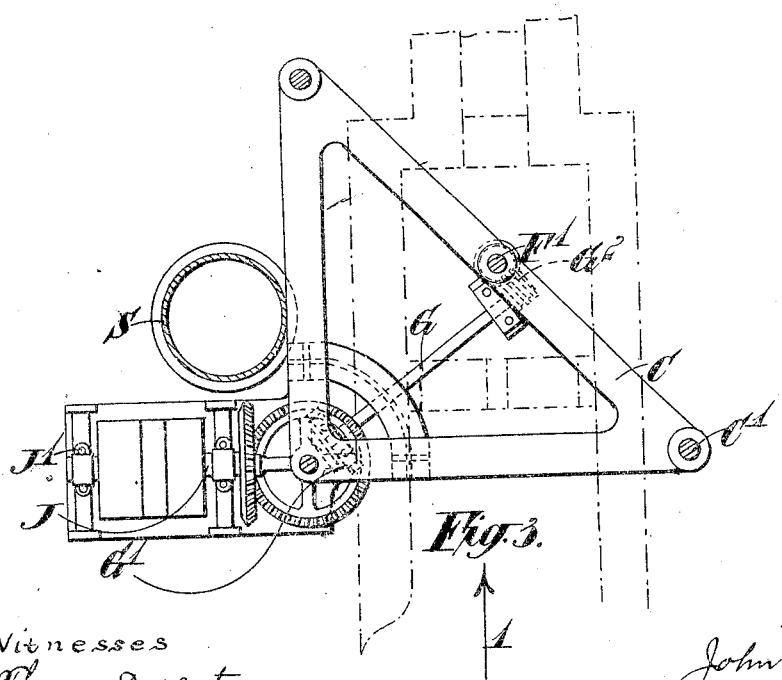

In the accompanying drawings, which illustrate, by way of example, apparatus constructed according to this invention for drawing glass cylinders, Figure 1 is an elevation, partly in section, looking in the direction of the arrow 1 in Fig. 3. Fig. 2 is an elevation looking in the direction of the arrow 2 in Fig. 4. Fig. 3 is a plan in section on the line 3 3 of Fig. 1. Fig. 4 is a top plan view of the apparatus. Fig. 5 is an enlarged section of the graduated cooling-chamber, showing in dotted lines the method of increasing the number of graduations. Fig. 6 is an enlarged section of the rotating head. Fig. 7 is an enlarged plan of a blowpipe-centering guide. Fig. 8 is a side elevation, and Fig. 9 a front elevation, of a modified form of apparatus.

Upon a base A is placed a triangular plate B with a secondary triangular base-plate C mounted above it on two pillars C' and a curved bracket C² and suitably braced to form a rigid framing. Supported above the secondary base C is an inclosing heating-chamber D for the vessel E containing the molten glass, and this vessel is supported on a disk F of refractory material upon the top of a short central shaft F', passing up through the rigid frame C and provided with a worm-wheel F², rotatable by means of a worm G² on a transmission-shaft G, having a bevel-pinion G' engaging a bevel-pinion H' on a vertical driving-shaft H. The vessel containing the molten glass is separated from its supporting-disk F—say by blocks of fire-clay E'—so that passages are left beneath it through which the gas-flames can pass. Mounted in bearings J' upon the bottom portion of the framing is a main driving-shaft J, geared to the vertical shaft H. A graduated cooling-chamber K is mounted centrally over the mouth of the vessel E and surrounds the opening in the casing through which the cylinder of glass is drawn.

The cooling-chamber K, as shown in Fig. 5, comprises an outer casing K with an internal spiral coil of pipe K', supplied with cooling fluid. Cooling-air is introduced to an annular conduit K², formed round the casing under the coil, and thence passes into a second lower annular conduit K³. The upper and lower conduits are provided with annular orifices K⁴ K⁵, respectively, through which cylinders of cooling-air are forced up inside the chamber and around the cylinder being drawn. If desired, as shown in dotted lines in Fig. 5, further annular conduits and orifices may be added to the chamber and the cooling-coil may be dispensed with.

Guided by the two pillars C' and the vertical driving-shaft H is a cross-frame L, having long screwed rods L' attached to it, which pass up through nuts M' or internally-threaded bushes in an upper fixed triangular frame M. These bushes are provided with bevel-pinions M², driven through bevel-pinions N' on transmission-shafts N from a bevel-pinion H² on the vertical driving-shaft H, a clutch O being provided controlled through rods O' from a lever O² near the base of the machine, so that through the gear and the long screwed rods L' the movable cross-frame L may be raised or lowered and its motion started or stopped quickly.

Mounted centrally upon the movable cross-frame L is a rotatable head P', adapted to engage with the upper end of the blowpipe P, as shown in detail in Fig. 6. The head is secured to the blowpipe by two hinged clips W, which engage abutments on the head and pipe, an air-tight joint being secured by the use of semicylindrical rubber washers W'. This head is driven by a worm-wheel Q³ through a worm Q², transmission-shaft Q, and bevel-pinion Q' from a bevel-pinion H³ on the vertical shaft H, the speed of rotation of the head being the same as that of the vessel E, holding the molten glass. To the under side of the movable cross-frame L is attached a bracket L², bearing at its lower end a hinged guide-clip R, having friction-rollers R', which when the clip is closed encircle the blowpipe P and keep it in vertical alinement as it rotates, as illustrated in detail in Fig. 7. The bracket L² is so shaped that it can pass freely up and down in the cooling-chamber K.

Air is fed through the rotating head to the upper end of the blowpipe by means of fixed and flexible pipes P², the latter passing over a pulley P³ at the upper portion of the machine. These pipes are connected, through a regulating-valve P⁴, with the cylinder of a mechanical compressor S, and the valve is provided with one or more grooved pulleys P⁵, round which passes a weighted cord L³, attached to the moving cross-frame L and guided by pulleys L⁴, secured to the top frame.

The pulleys P⁵ on the valve-spindle upon which they are mounted are also connected to the piston S' of the compressor S, so that the piston and the valve are automatically moved to supply and control the air to the blowpipe P, according to the position of the frame L, thus adjusting the air-supply to the length of the cylinder being drawn.

The space in the compressor-cylinder S beneath the piston S' is preferably connected by a branch pipe S² to another pipe T, which conveys air from a separate source under pressure to the graduated cooling-chamber K². This branch pipe is controlled by a cock or hand-lever T' and is used as hereinafter described to admit supplementary air—that is to say, air independent of the movement of the compressor S—to the cylinder at certain stages of its manufacture.

The swinging frame U for the removal of the cylinder is conveniently mounted on a vertical support U' near one of the guide-pillars and can be moved up and down on its support by means of a rack U² and pinion U³. The frame is provided with hinged bands U⁴, lined with suitable material and secured by clips U⁵ and can be turned by gearing U⁶ into a horizontal position, in addition to swinging round its vertical support as a center.

The operation of the machine is as follows: The enlarged end of a prepared blowing-pipe P is furnished with sufficient molten glass to form a globe at the end in the ordinary manner. The temporary cover, if such is provided, is then removed from the vessel E containing the supply of molten glass, and the blowpipe P is passed down through the cooling-chamber K, so that the glass at its end comes into contact with the glass in the vessel E. The upper end of the blowpipe P is attached to the rotating head P' and its lower portion embraced and guided by the clip R. The shaft H and gear for rotating the vessel E and the head P' is now put into operation, and the glass on the blowpipe P and in the vessel E quickly becomes homogeneous and of equal temperature. The lifting or drawing gear is then started and the regulating-valve P⁴ opened to allow the air under pressure to pass through the blow-pipe P into the body of metal at the end until it is blown to the diameter required. At this stage the operation of the air-valve P⁴ is preferably manually controlled and supplementary air admitted through cock T' until the cone-shaped cylinder end is formed and set; but as the drawing continues the gear is used, so that the continued admission of air is automatically controlled to keep the cylinder of uniform diameter as is passes through the cooling-chamber K. When the cylinder is drawn to its desired length, the admission of air is stopped and an escape-cock opened, so that the cylinder is subjected only to atmospheric pressure. The lifting and rotating is then continued until the glass joining the bottom of the cylinder and the molten metal in the vessel becomes merely a thin cord, which can be readily severed. After severing the connection the raising mechanism is reversed until the lower dome end comes within the zone of heat, when, by admitting the before-mentioned supplementary air and again rotating, the dome is extended and formed into proper thickness. The mechanism is then again reversed, the air-supply stopped, and a hole made through the center of the dome by applying a piece of hot metal or in some other convenient way. On again lowering the cylinder till the dome comes within the zone of heat and continuing the rotation the dome falls back into cylindrical form, and the cylinder can be lifted clear of the cooling-chamber finished.

Instead of manipulating the dome end, as above described, after having stopped the lifting-gear and opened the interior of the cylinder to the atmosphere by turning the escape-cock the rotation may be continued and the cylinder cut at the top of the cooling-chamber, the lower portion being allowed to fall back into the vessel of molten glass for use later on.

When the cylinder has been raised clear of the cooling-chamber and the mechanism stopped, the swinging arm O is brought into position and the cylinder embraced by the bands U⁴. The blowpipe P is released from its head P' and centering-guide R and the cylinder in the frame U moved clear of the machine and brought to a horizontal position, when after lowering it can be removed for cutting into lengths, splitting, and annealing in the usual way.

While one cylinder is being finished, as above described, another operator may be preparing the next blowpipe ready for the drawing of another cylinder.

Figure 9:
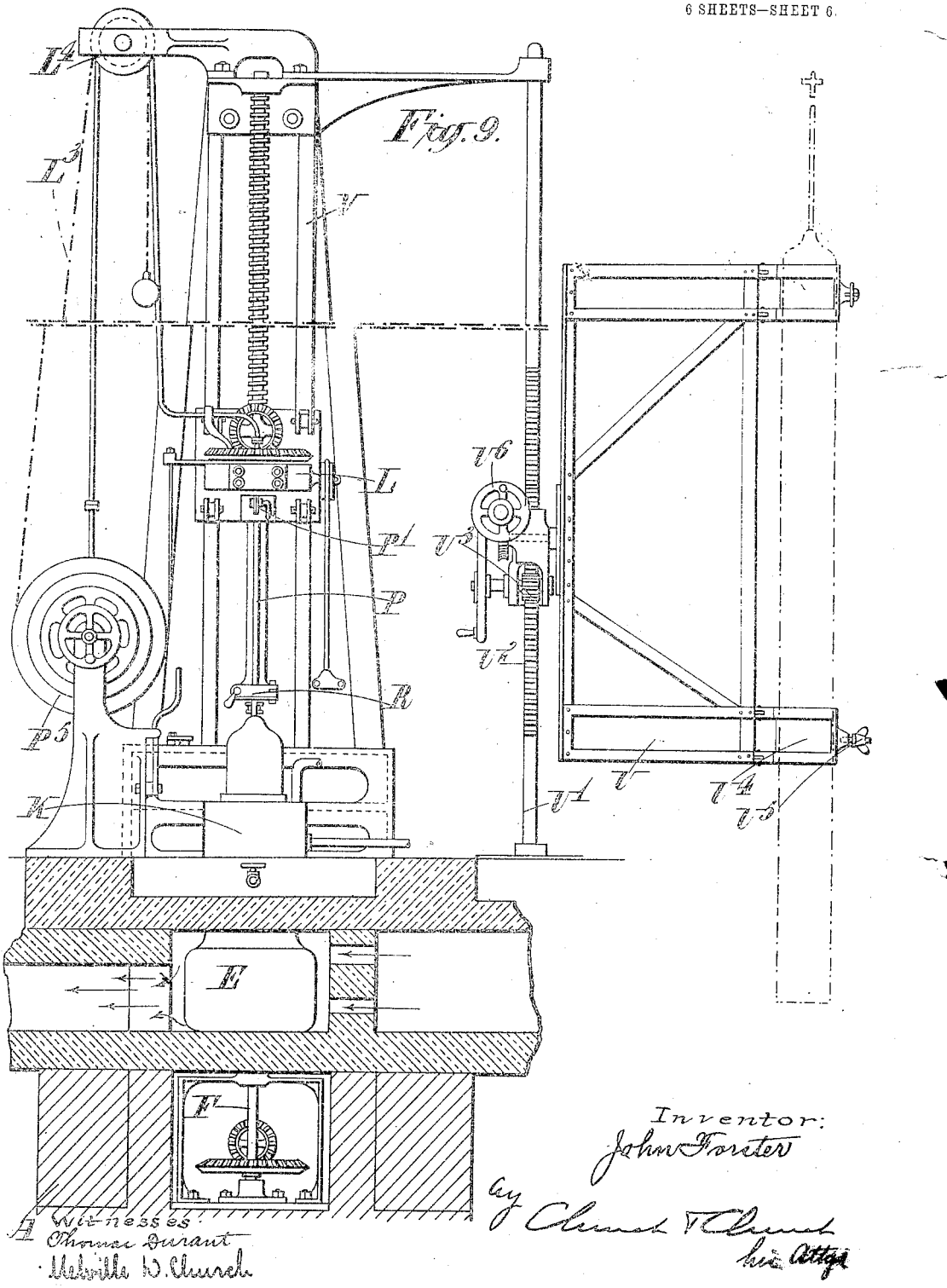

Referring to Figs. 8 and 9, when the machine is designed to deal with smaller or shorter cylinders the moving frame may be supported on one standard V instead of using the triangular frame, which is convenient when dealing with cylinders of large diameter and length, and in other respects it will be understood that details of contruction of the machine and apparatus may be varied without departing from the spirit of this invention. The rotation of the vessel containing the molten glass within the heated chamber insures that all the glass in the vessel shall be of a uniform temperature and properly fined, all the exterior exposed parts of sides and bottom of the vessel being brought under the influence of the gas-flame or other heating agent. The rotation of the blowpipe at the same speed as that of the vessel tends to produce the cylinder in correct shape and free from indentations, corrugations, waves, lines, or vanes and varying thicknesses. This result is further aided by the centering-guide for the blowpipe and the mechanism employed to supply the air. Further advantages of this invention are that the rotating cylinder may have its lower end finished cylindrically and without waste and that the cylinder as it emerges through the graduated cooling-chamber is uniformly and gradually cooled, unequal contraction and consequent weakness in the walls of the cylinder being thus avoided, while when finished it can be safely handled and deposited by means of the embracing-bands of the removal-frame.

A machine according to this invention may be driven from any convenient source of power, or it may be hand-driven. In either case the gearing may be arranged to give various speeds, so that cylinders of different thicknesses can be obtained.

It will of course be understood that although the invenion has been described with reference to the drawing of cylinders of glass, yet it may be used in the manufacture of other glass articles.

What I claim as my invention, and desire to secue by Letters Patent, is—

1. In apparatus for drawing glass the combination of a heating-chamber, a vessel containing a reserve of molten glass within the chamber, a blowpipe, means for rotating the vessel and the blowpipe together about a vertical axis, means for raising and lowering the pipe relatively to the vessel and means for supplying air to the blowpipe.

2. In apparatus for drawing glass the combination of a heating-chamber, a vessel containing a reserve of molten glass within the chamber, a blowpipe, means for rotating the vessel and the blowpipe together about a vertical axis, means for raising and lowering the pipe relatively to the vessel means for supplying air to the blowpipe, and means for maintaining the blowpipe in vertical alinement.

3. In apparatus for drawing glass the combination of a heating-chamber, a vessel containing molten glass within the chamber, a blowpipe, means for rotating the vessel and the blowpipe, means for raising and lowering the pipe relatively to the vessel an air-compressor and means operated by the vertical movement of the blowpipe to displace from the compressor and force through the pipe a quantity of air proportional to the size of the glass cylinder being drawn.

4. In apparatus for drawing glass the combination of a heating-chamber, a vessel containing molten glass within the chamber, a blowpipe, means for rotating the vessel and the blowpipe, an air-compressor means for raising and lowering the pipe relatively to the vessel, means operated by the vertical movement of the blowpipe to displace from the compressor and force through the pipe a quantity of air proportional to the size of the glass cylinder being drawn and mechanically-operated means for removing the drawn cylinder.

5. In apparatus for drawing glass the combination of a heating-chamber, a vessel containing molten glass within the chamber, a blowpipe, mean for rotating the vessel and the blowpipe, mean for raising and lowering the pipe relatively to the vessel means operated by the vertical movement of the blowpipe for forcing through the pipe a quantity of air proportional to the size of the glass cylinder being drawn, means for admitting supplementary air to the blowpipe and mechanically-operated means for removing the drawn cylinder.

6. In apparatus for drawing glass the combination of a heating-chamber, a vessel containing molten glass within the chamber, a blowpipe, means for rotating the vessel and the blowpipe, means for raising and lowering the pipe relatively to the vessel means for supplying air to the pipe, an opening in the heating-chamber above the vessel and a graduated cooling-chamber upon said opening having upwardly-directed annular orifices and means for forcing cooling-air through the orifices to form cylinders outside the glass being drawn from the chamber.

7. In apparatus for drawing glass the combination of a heating-chamber, a vessel containing molten glass within the chamber, a blowpipe, means for rotating the vessel and the blowpipe, means for raising and lowering the pipe relatively to the vessel means for supplying air to the pipe, an opening in the heating-chamber above the vessel a graduated cooling-chamber upon said opening having annular orifices, means for forcing cooling-air through the orifices and outside the glass being drawn from the chamber, an air-supply for the graduated cooling-chamber and a valve-controlled connection between said air-supply pipe and the blowpipe.

8. In apparatus for drawing glass the combination of a heating-chamber, a vessel containing molten glass so supported that the heating agent can pass under and around it, a blowpipe, means for rotating the vessel and the blowpipe, means for raising and lowering the pipe relatively to the vessel, means operated by the vertical movement of the blowpipe for forcing through the pipe a quantity of air proportional to the size of the glass cylinder being drawn an opening in the heating-chamber above the vessel, a graduated cooling-chamber around said opening, means for supplying air to the graduated cooling-chamber and supplementary air to the blowpipe and mechanically-operated means for removing the drawn cylinder.

9. In apparatus for drawing glass the combination of a heating-chamber, a vertical rotatable shaft projecting into the chamber, a disk on the top of the shaft, a vessel containing molten glass within the chamber supported on the disk by blocks of refractory material so that the heating agent can pass under and around it, means for rotating the shaft and means for removing molten glass from the vessel.

10. In apparatus for drawing glass the combination of a heating-chamber, a vertical rotatable shaft projecting into the chamber, a disk on the top of the shaft, a vessel containing molten glass within the chamber supported on the disk by blocks of refractory material so that the heating agent can pass under and around it, means for rotating the shaft, a frame capable of vertical movement relatively to the vessel, a rotatable head mounted on the frame and adapted to receive a blowpipe, a centering-guide for the lower end of the blowpipe, and means for rotating the head and for supplying air thereto.

11. In apparatus for drawing glass the combination of a heating-chamber, a vertical rotatable shaft projecting into the chamber, a disk on the top of the shaft, a vessel containing molten glass within the chamber supported on the disk by blocks of refractory material so that the heating agent can pass under and around it, means for rotating the shaft, a frame capable of vertical movement relatively to the vessel, a rotatable head mounted on the frame and adapted to receive a blowpipe, a centering-guide for the lower end of the blowpipe a vertical driving-shaft, worm and bevel gearing between the driving-shaft and the vessel-supporting shaft and between the driving-shaft and the rotatable head whereby the vessel and blowpipe may be rotated at the same speed and means for supplying air to the blowpipe.

12. In apparatus for drawing glass the combination of a heating-chamber, a vertical rotatable shaft projecting into the chamber, a disk on the top of the shaft, a vessel containing molten glass within the chamber supported on the disk by blocks of refractory material so that the heating agent can pass under and around it, means for rotating the shaft, a frame capable of vertical movement relatively to the vessel, a rotatable head mounted on the frame and adapted to receive a blowpipe, a centering-guide for the lower end of the blowpipe, means for rotating the head, an air-compressor, a valve-controlled pipe between the air-compressor and the head and operative connections between the vertically-movable frame and the valve.

13. In apparatus for drawing glass the combination of a heating-chamber a vertical rotatable shaft projecting into the chamber, a disk on the top of the shaft, a vessel containing molten glass within the chamber supported on the disk by blocks of refractory material so that the heating agent can pass under and around it, means for rotating the shaft, a frame capable of vertical movement relatively to the vessel, a rotatable head mounted on the frame and adapted to receive a blowpipe, a centering-guide for the lower end of the blowpipe, means for rotating the head, an air-compressor, a valve-controlled pipe between the air-compressor and the head, operative connections between the vertically-movable frame and the valve and a frame provided with means for embracing the cylinder and rotatable upon a vertical and a horizontal axis.

14. In apparatus for drawing glass the combination of a heating-chamber, a vessel containing molten glass so supported that the heating agent can pass under and around it, a blowpipe, means for rotating the vessel and blowpipe, means for raising and lowering the pipe relatively to the vessel and for supplying air thereto, an opening in the heating-chamber above the vessel, a graduated cooling-chamber around said opening comprising an air-conduit means for supplying air thereto, a plurality of upwardly-directed annular orifices in the conduit whereby the air passes up in cylinders outside the glass being drawn from the chamber, and a coil of pipe and means for passing a cooling liquid through the coil.

In testimony whereof I have signed my name to this specification in the presence of two subscribing witnesses.

JOHN FORSTER.

Witnesses:
HERBERT MALTBY,
WALTER J. SKERTEN.